US012561015B2

(12) United States Patent
Kung et al.

(10) Patent No.: US 12,561,015 B2
(45) Date of Patent: Feb. 24, 2026

(54) WRITABLE-ERASABLE MEDIUM AND A HAND HOLDABLE WRITING DEVICE

(71) Applicant: FRESHAPE SA, Villaz-St-Pierre (CH)

(72) Inventors: Yen-Cheng Kung, Tolochenaz (CH); Yuhang Liu, Bussigny (CH)

(73) Assignee: FRESHAPE SA, Villaz-St-Pierre (CH)

( * ) Notice: Subject to any disclaimer, the term of this patent is extended or adjusted under 35 U.S.C. 154(b) by 0 days.

(21) Appl. No.: 18/681,715

(22) PCT Filed: Sep. 22, 2022

(86) PCT No.: PCT/EP2022/076437
§ 371 (c)(1),
(2) Date: Feb. 6, 2024

(87) PCT Pub. No.: WO2023/046863
PCT Pub. Date: Mar. 30, 2023

(65) Prior Publication Data
US 2025/0004584 A1      Jan. 2, 2025

(30) Foreign Application Priority Data

Sep. 24, 2021   (EP) ..................................... 21198934

(51) Int. Cl.
G06F 3/038          (2013.01)
G06F 3/0354         (2013.01)
G06F 3/046          (2006.01)
(52) U.S. Cl.
CPC ........ G06F 3/0386 (2013.01); G06F 3/03545 (2013.01); G06F 3/046 (2013.01)
(58) Field of Classification Search
CPC ..... G06F 3/0386; G06F 3/03545; G06F 3/046
See application file for complete search history.

(56) References Cited

U.S. PATENT DOCUMENTS

| | | | | |
|---|---|---|---|---|
| 5,389,945 A | * | 2/1995 | Sheridon | ................. G09F 9/372 |
| | | | | 345/84 |
| 10,538,111 B2 | * | 1/2020 | Gila | ...................... G02F 1/1673 |
| 2006/0012562 A1 | | 1/2006 | Pope et al. | |
| 2013/0046324 A1 | * | 2/2013 | Williams | ................. H04N 1/10 |
| | | | | 358/1.9 |
| 2020/0201454 A1 | | 6/2020 | Nguyen et al. | |

FOREIGN PATENT DOCUMENTS

WO          2011/038681 A1      4/2011

OTHER PUBLICATIONS

Mourouzi, et al., "SweepScreen: Sweeping Programmable Surfaces to Create Low-fi Displays Everywhere" CHI'18 Extended Abstracts (2018) Montreal, Quebec, CA,, DOI:10.1145/3170427.3188462, pp. 1-6.

* cited by examiner

*Primary Examiner* — Bryan Earles
(74) *Attorney, Agent, or Firm* — Robert C. Netter, Jr.; Dann, Dorfman, Herrell & Skillman

(57) ABSTRACT

The present invention concerns a hand holdable writing tool for generating a visual representation on a writable-erasable, passive medium. The invention also provides the assembly of the writing tool and the medium. The writing tool comprises a sensor capable of sensing non-visible light, and a data processing entity, configured for activating and/or disactivating individual inducer entities of the tool, thereby inducing image elements of the medium to generate said visual representation.

18 Claims, 3 Drawing Sheets

WRITABLE-ERASABLE MEDIUM AND A HAND HOLDABLE WRITING DEVICE

The present application is § 371 application of PCT/EP2022/076437, filed Sep. 22, 2022, which claims priority to EP Application Serial No. 21198934.8, filed Sep. 24, 2021. The entire disclosure of each of the foregoing applications is incorporated by reference herein.

TECHNICAL FIELD

The present invention relates to writable and erasable media and devices for generating a visual representation on the medium on the basis of digital and/or electronically stored information. The invention relates to the field of electronic paper. More specifically, the invention provides a hand-holdable, wireless writing tool for generating the visual representation and a writable and erasable medium.

BACKGROUND ART

Writable and erasable media are substrates on which a user generates a visual representation (graphical or textual information) generally with the aid of a writing tool, whereby the visual representation can be erased and a new visual representation can be generated. The blackboard can be seen as an original form of a writable-erasable medium, wherein the writing tool is a piece of chalk, and the medium is erased by cleaning the blackboard by aid of a suitable cleaning solvent such as water.

There are simple writable and erasable media that avoid the disadvantages of a writing tool that, as chalk, is worn off with time and needs to be replaced, and of needing a solvent for erasing the medium. A well-known erasable medium allowing a user to write down or draw information on the medium is the Magna Doodle display, which comprises a substrate filled with a thick, opaque white liquid containing tiny dark magnetic particles. The writing device in this case is a magnet-tipped stylus. This magnet produces a magnetic field, which, with the magnet tip getting close enough to the writing surface of the display, exerts a force on the dark particles, which are drawn to the drawing surface and thereby generate a visual effect. For erasure, the particles are removed from the drawing surface, again by a magnet, this time in the form of an erasing bar sliding at the back of the medium. In summary, the writing tool directs energy into the display, acting on magnetic image elements, which generate a visual effect by changing their position or orientation in the medium.

The Magna Doodle display is generally used as a toy and cannot be used for displaying digitally stored information.

It has been a desire to generate visual information from an external source on a writable-erasable display, not only information generated directly by a user with the writing tool. It has thus been an objective to reproduce electronically and/or digitally stored visual information on a writable-erasable medium with reasonable time efficiency and degree of reproducibility. The ways for generating a digitally stored visual information on a displaying platform could be as simple as printing on a paper by an ink-jet or laser printer which allows reproducing the very same visual information within a short time compared to one-stroke-at-a-time writing. However, usually the visual information printed on the paper is not erasable, and can therefore not be re-written.

Commonly used LCD (liquid crystal display), OLED (organic light emitting diode display) and electrophoresis display are the displays which could serve the function of presenting digitally stored information and being erasable at the same time. Different than a printing paper, an internal addressing device such as a passive-matrix or an active-matrix driving circuit with millions pixel-controlling units is required to write the visual information. For having a larger displayable area and display resolution, the required number of pixel-controlling units also increases, which further demand a stricter quality control in fabrication uniformity, stronger capability of the driver ICs (integrated circuits), more complicated system-level control, therefore the manufacturing cost and complexity increase faster than just linear trend. In the context of the present invention, it is an objective to provide a writable-erasable medium that can be provided without an internal addressing device, so that the issues mentioned above for scaling up the displayable area can be avoid. It is an objective to provide a medium that is bi-stable, so that the addressing process is needed only for changing the displaying contents. The displayable area and dimension are preferably not limited by the number of pixel-controlling units, so that there is more flexibility in the choices of formats of displaying media and addressing tools. The fabrication complexity and the manufacturing cost of the medium should be also reduced. On the other hand, such displays still require a writing tool for generating the visual representation on the medium. The writing tool may be external or the medium may be provided integrally with the writing tool.

Electronically driven writable-erasable media encompass e-paper. Electronic paper has probably been first developed in the 1970s by Nick Sheridon at Xerox corporation. The first electronic paper, called Gyricon, consisted of polyethylene spheres between 75 and 106 micrometers across (U.S. Pat. Nos. 5,389,945, 5,389,945). Each sphere is composed of negatively charged black plastic on one side and positively charged white plastic on the other (each bead is thus a dipole). The spheres are embedded in a transparent silicone sheet, with each sphere suspended in a bubble of oil so that it can rotate freely. The display comprises numerous electrodes on opposed sides of the silicone sheet, such that an electric field can be generated at any desired position in the sheet. The polarity of the voltage applied to each pair of electrodes then determines whether the white or black side is face-up, thus giving the pixel a white or black appearance.

U.S. Pat. No. 5,389,945 discloses a Gyricon e-paper display using an addressing wand connected wirelessly to a work station. The display comprises, on its lateral sides, registration marks, for cooperating with suitable sensors in the wand in order to track wand speed and alignment. The wand further contains a row of modulating electrodes. As the addressing wand is moved relative to the display sheet and the voltages on its individual modulating electrodes in the array are switched in accordance with the pixel information in the document to be written, appearing on a remote work station, an electrical field will be established between the electrodes and an electrically conductive ground plane. The electrical field affects the orientation of the Gyricon spheres and results thus in the creation of visual representations on the e-paper. However, the voltages required to generate the required electrical field in this system are quite high, rendering a truly wireless wand difficult to put into practice. Furthermore, this concept requires the presence of registration marks on the border of the medium. The border may reduce the surface available for displaying. Furthermore, this concept requires the wand to be sufficiently large to cover the entire display in the side-to-side direction. In other words, this concept limits the size of the display (or e-paper) in that the e-paper is necessarily narrower than the longitudinal extension of the wand. In principle, the wand needs to be guided, to make sure that the sensors can capture the registration marks.

U.S. Pat. No. 6,498,597 discloses a scroll-like flexible medium stored in a cylindrical case. The operation mode of this e-paper is similar to the one based on the Gyricon materials described above with respect to U.S. Pat. No. 5,389,945.

U.S. Pat. No. 6,806,453 discloses a hand-held scan-print device for scanning over a paper-like rewritable sheet containing a bistable, electrochromic colorant susceptible to localized electrical fields. A disadvantage of this system is that the scanning of an original image is required for obtaining information allowing the device to determine position and orientation of the printheads contained in the device. Consequently, the image cannot be scaled and cannot be used independently with writable sheets having variable sizes.

US 2006/0170981 discloses a system for writing bistable media with a writehead. The writehead comprises a roller containing a write electrode, which, when in electrical contact with an electrode of the media, can induce the write voltage addressing the corresponding pixel. This teaching requires the establishment of an electric contact and thus current flow between the writehead and the media. This renders the media susceptible of losing function due to soiling and humidity. Furthermore, the roller-based writehead renders the device difficult to realize as a hand-held device.

Christos Mourouzi et al "SweepScreen: Sweeping Programmable Surfaces to Create Low-fi Displays Everywhere", Proc. CHI 2018, disclose a hand-held writing device comprising a row of electromagnets combined with a movement sensor to create an image on a magnetophoretic surface. The device, which is connected via cable to a smartphone, comprises an optical mouse sensor for tracking the position of the device. This document suggests the creation of assembled pictures and a camera to automatically detect already printed parts of an image.

US2020/0201454 discloses a large area display comprising an IR sensor placed on the display for allowing a stylus to allow for local erasure of a picture.

The present invention addresses the objectives depicted above.

Problems Addressed and Summary of the Invention

The present inventors address the objective to provide a writable-erasable medium and/or an e-paper display, preferably a passive, non-light emitting medium, and/or a writing device, which can be used to generate a visual representation on the basis of electronically and/or digitally stored data.

It is an objective to provide a medium that lacks an internal addressing system, such as an active-matrix or a passive-matrix, which requires a complicated and costly micro-fabrication process. The invention provides a medium that provides more possibilities with respect to the materials used, and the realization of lighter-weighted and/or flexible displays.

It is an objective to provide a medium that can be addressed by a writing tool without imposing any constraints with respect to the relative and/or absolute dimensions of the medium and the writing tool.

It is also an objective of the invention to provide a hand holdable, wireless writing tool for generating a visual representation on the medium.

In addition, it is an objective to provide a writable-erasable medium which may also be adapted for use with a pen-like, hand-holdable writing tool, in particular for generating a visual representation by a user passing the pen-like driver device over the surface of the medium. It is an objective to provide a more intuitive operation in terms of the freedom in relative printing direction and angle between the writing tool and the medium.

In an aspect, the invention provides a writing device suitable for generating a visual representation on a writable-erasable medium, the device comprising:

a sensor capable of sensing non-visible light and configured to produce signals related to two-dimensional marker information associated with said writable-erasable medium;

a plurality of inducer entities, each inducer entity being configured for assuming independently at least two states, a first, inducing state, and a second, passive state;

a data processing entity, configured for acting on individual inducer entities so as to switch between said first and second states, wherein said data processing entity is preferably configured to act on said inducer entities (1) on the basis of (2) while taking into consideration and/or (3) as a function of the signals produced by said sensor and/or the visual representation to be generated on said writable-erasable medium.

In an aspect, the invention provides a writing device suitable for generating a visual representation on a writable-erasable medium, the device comprising:

a sensor capable of sensing non-visible light and configured to produce signals related to two-dimensional marker information associated with said writable-erasable medium;

a plurality of inducer entities, each inducer entity being configured for assuming independently at least two states, a first, inducing state, and a second, passive state, wherein, when in said first state, said inducer entities are configured for directing a predetermined amount of energy in a predetermined direction;

a data processing entity, configured for acting on individual inducer entities so as to switch between said first and second states, said data processing entity being configured to act on said inducer entities on the basis of the signals produced by said sensor and/or on the basis of the visual representation to be generated on said writable-erasable medium.

In an aspect, the invention provides a writing tool that is configured to write, drive and or address the writable-erasable medium of the invention.

In an aspect, the invention provides a writing tool that is configured to generate a visual representation of digitally stored visual information on the writable-erasable medium of the invention.

In an aspect, the invention provides a writable-erasable medium comprising a plurality of image elements, which, depending on a position, configuration, orientation and/or light absorption characteristics of said image elements in said medium, affect the reflection and/or transmission of visible light impinging on said writable-erasable medium and contribute to the generation of said visual representation. Preferably, said medium further comprises a two-dimensional marker information.

In an aspect, the invention provides a writable-erasable medium capable of providing an erasable visual representation, the medium comprising a plurality of image elements, which, depending on a position, configuration, orientation and/or light absorption characteristics of said image elements, affect the reflection of visible light impinging on said writable-erasable medium and contribute to the generation of said visual representation, said medium further comprising a two-dimensional marker information, and wherein said marker information is transparent to visible light.

In an aspect, the invention provides a writable-erasable medium that is configured to be written, addressed and/or be driven by the device of the invention.

In an aspect, the invention provides an assembly comprising the writing device and the writable-erasable medium of the invention.

Further aspects and preferred embodiments of the invention are defined herein below and in the appended claims. Further features and advantages of the invention will become apparent to the skilled person from the description of the preferred embodiments given below.

Hereinafter, preferred embodiments of the device of the invention are described, in order to illustrate the invention, without any intention to limit the scope of the present invention.

DETAILED DESCRIPTION OF THE PREFERRED EMBODIMENTS

The present invention relates to a writing device for a writable-erasable medium and to the medium that can be written by way of the writing device.

The term "medium" encompasses, in the context of the present invention, a display, a screen, platform, an e-paper, and any other type of substrate, comprising a surface on which visual representation can be displayed. Preferably, the medium comprises a generally smooth and preferably flat and/or even display surface. The medium may also be a flexible and/or curved medium.

The term "visual representation" encompasses graphical information, including images, graphs, lines, and written information, such as letters, words, numbers, signs, text, for example. The "visual representation" is preferably visible and distinguishable to the human eye and thus reflects or emits light in the visible spectrum. The "visual representation" is preferably provided and/or present in the form of electronically and/or digital data in the device of the invention, and is generated by the device on the basis of such data. As the invention relates to a writable-erasable medium, the visual representation generated on the medium is preferably writable and/or erasable.

The visual representation generated by the device and/or tool of the invention is preferably stable, semi-stable and/or bistable. Once the visual representation is generated, it preferably remains visible and/or readable for a period that is long enough to fulfil a desired purpose of image or information medium. For example, the once generated, the visual representation preferably exists for 30 seconds to 48 hours or longer, preferably 1 minute to 24 hours or longer, more preferably 5 minutes to 12 hours or longer, most preferably 10 minutes to 6 hours or longer.

The terms "writable-erasable" refer to the fact that the visual representation can be shown and can be erased, for example cancelled or cleared, from the medium, and new, other and/or the same visual representation can be shown thereafter. The medium can be used for repeated writing and erasing and is thus preferably re-writable and/or re-erasable. The generation of said visual representation on said medium can be seen as writing, printing, addressing and or driving said medium, which is preferably done by the writing tool of the invention.

Figure 1:
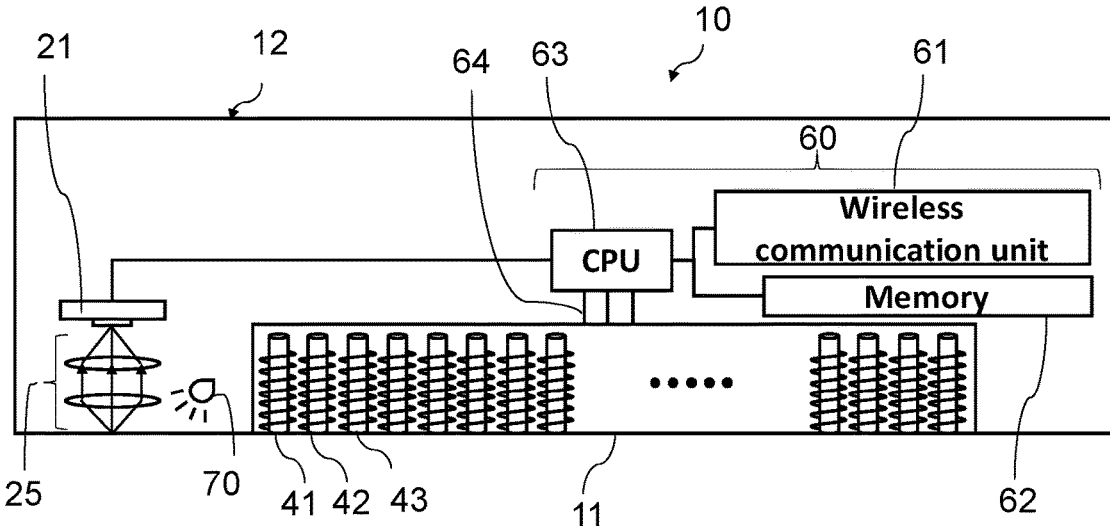
FIG. 1 is a schematic view of a hand holdable device according to an embodiment of the invention.

FIG. 1 shows an embodiment of a writing tool 10 in accordance with an embodiment of the present invention. The writing tool may also be referred to as "writing device", "addressing device", "printing device" or "driver", as it is configured to act upon image entities contained in the medium, in order to generate said visual representation.

The writing tool 10 is preferably configured to use digital and/or electronical information, preferably digitally and/or electronically stored information and to act on the medium on the basis of that information to generate the corresponding visual representation on the medium. Due to the capacity of writing, erasing and rewriting digitally stored information, the medium of the invention may also be referred to as an electronic paper or e-paper.

The writing tool 10 is preferably wireless. It preferably comprises a wireless communication module or unit 61. Furthermore, the writing tool preferably comprises an internal supply of electrical energy, such as a battery or a solar cell (not shown).

Figure 4:
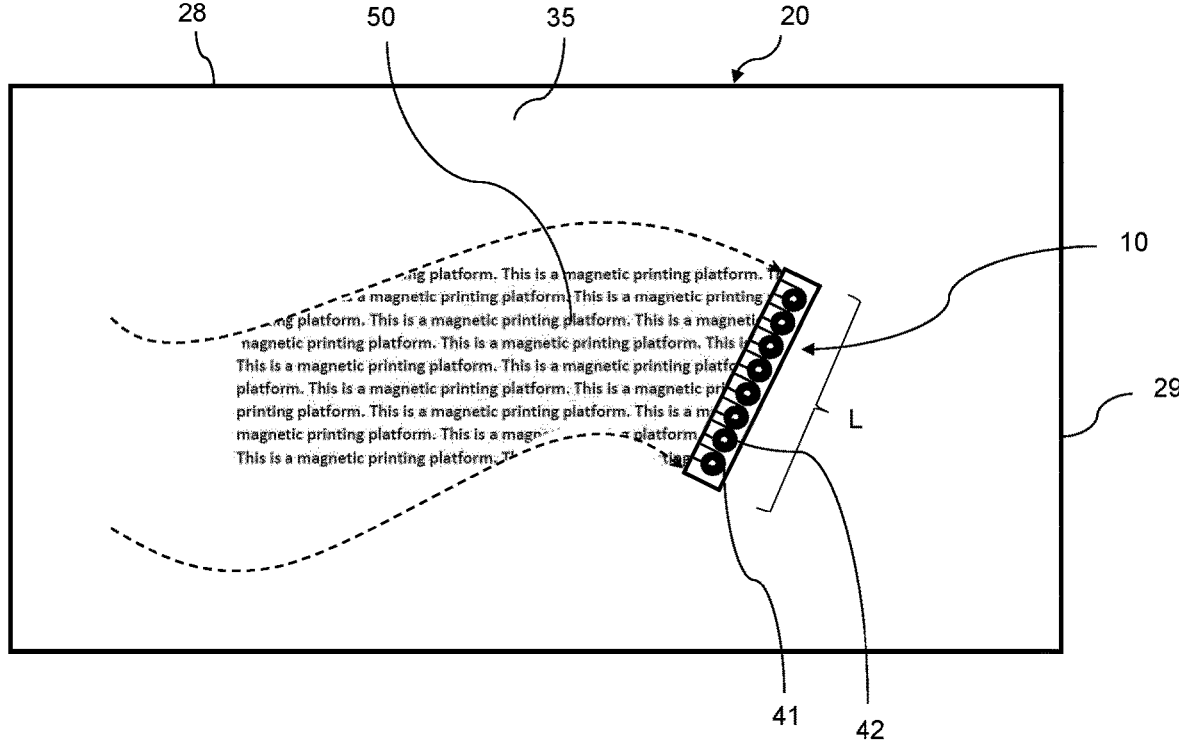
FIG. 4 illustrates the generation of visual information on a medium in accordance with an embodiment of the invention.

The writing tool 10 is preferably hand holdable and/or hand held. It is preferably adapted for being kept in the hand of a user, such that the user can move and preferably slide it over the medium, as shown in FIG. 4 and described in more detail herein below. Accordingly, the writing tool 10 has preferably relatively little weight, for example 1 kg or less, preferably 500 g or less, more preferably 100 g or less. For example, the writing tool has a weight of from 10 g to 100 g. Preferably, the writing tool can be conveniently manipulated by an average person and preferably also by a child, and is also easy to be carried along by the user for use at any moment, for example on one's way.

The writing tool 10 may be realized in the form of a longitudinal bar, as shown in FIGS. 1 and 4, but may have any shape that render it suitable for the manipulation by hand. For example, the writing tool may have an ergonomically adapted outer shape, adapted to the grip of a hand and facilitating the hand-held use.

The writing tool 10 further comprises a lower, preferably substantially flat surface 11, which is intended to be in contact, in close vicinity or within a predetermined, maximum working distance with the medium surface 35 of the medium when the tool is used for writing said visual representation on the medium. The position of the device when it is used for writing the visual representation on the medium is also the "operative" and/or "operational" position of the device with respect to the medium. In this position, the flat lower surface 11 of device is generally as close as possible to the upper surface 35 of the medium and the surfaces 11 and extend substantially in parallel.

As mentioned elsewhere in this specification, there may also be an operational position with the writing device not being in direct contact with respect to the medium. For example, there may be an operational position with the writing device being spaced-apart from the medium and/or with the lower surface 11 of the writing device being positioned at an angle, in particular tilted, with respect to the viewing surface 35 of the medium.

It is noted that the writing tool comprises a casing 12, wherein the inner components are generally integrated inside and/or maintained by or within said casing. The lower surface 11 can be seen as part of the casing.

The writing tool preferably comprises one or more sensors 21. The sensor is preferably suitable to capture non-visible light, such as UV (ultraviolet) and/or infrared (IR), for example. In an embodiment, the one or more sensors capture exclusively UV light, exclusively IR light, or exclusively IR and UV light.

For the purpose of the present specification, UV light is light having a wavelength of 10 to 400 nm.

For the purpose of the present specification, IR light is light having a wavelength of greater than 700 nm to 1 mm.

For the purpose of the present specification, visible light is light having a wavelength of greater than 400 nm to 700 nm.

The sensor is preferably a 2D image sensor. The sensor (or if several, the sensors) is preferably suitable to capture a two-dimensional (2D) pattern and to produce signals related to the 2D pattern. As will described in more detail below, the 2D pattern is preferably marker information associated with the medium.

In an embodiment, the sensor 21 is selected from a CMOS or CCD image sensor.

In an embodiment, the tool comprises optics 25. The optics are provided so as to guide, direct, focus and/or filter the light reflected from a surface towards said sensor. The optics are preferably arranged such that the image of the markers on the medium can be clearly and/or effectively captured by the sensor. The optics may include one or more selected from the group consisting of lenses, mirrors and light filters. The light directed by said optics encompasses preferably non-visible light reflected or emitted from marker information associated with the medium. The optics are preferably arranged so as to capture light impinging on an opening or window on the lower surface 11, which is in proximity and preferably in contact with the medium surface 35 of the medium during use.

In an embodiment, the writing device preferably comprises a light source 70. Preferably, the light source emits non-visible light, preferably IR and/or UV light, more preferably exclusively either IR and/or UV light. The light source 70 and the optics 25 are preferably positioned in the device such that, when the device 10 is placed operationally on the surface of the medium (FIG. 3), the light emitted by source 70, when reflected by marker information 31 contained in or on the medium, will be directed towards the optical system 25 and guided to the sensor 21.

Preferably, the light source and the sensor are integral part of the writing device.

It is noted that the light source may not be required in situations where there is enough light from the environment that is reflected by the marker information 31, for example when the device is used in presence of direct sunlight. However, as the device is preferably, configured to be operational in all circumstances, the light source is preferably present, so as to make sure that enough light is reflected such that the sensor will generate an interpretable signal in all circumstances.

The writing tool preferably comprises a data processing entity 60, for example comprising a microprocessor and/or an CPU (central processing unit) 63, and a memory 62, which encompasses in particular a memory for digital stored information, such as RAM and/or ROM memory, for example. The information stored in the memory is preferably associated with the visual representation to be displayed on the medium. The memory 62 can also be removable memory, for example in the form of an external memory, such as a USB stick or a memory card, which is removably connected or inserted into the tool.

In another embodiment, the invention encompasses that the digital and/or electronic data corresponding to the visual representation is communicated by wireless transfer in real time and is thus not necessarily stored, or is only stored partly, on the device of the invention, while the visual representation is generated. The data may, for example, be transmitted from a wireless module of a work station, or any other source from where it can be sent by wireless transfer for example.

Preferably, the device comprises software and/or firmware for operating the device.

In an embodiment, said data processing entity is configured to determine, from the signal produced by said sensor, one or more selected from the group consisting of: (i) the position of the hand holdable device on the writable-erasable medium, (ii) the orientation or angle of the hand holdable device on the writable-erasable medium; and (iii) the position and/or orientation of one, several or all of said inducer entities with respect to said writable-erasable medium, and in particular with respect to an image element of said writable-erasable medium.

Preferably, the position referred to is an absolute position of the writing device relative to the writable-erasable medium. Preferably, the position is not a relative position, that is a position determined with respect to a previous position of the writing device.

Since the marker information is preferably a 2D information, the data processing entity is preferably configured to also determine the distance and/or the angle of the writing device with respect to the medium and in particular with respect to the viewing surface thereof. Depending on the inducer entities and the way or energy used by the inducer entities, an image may also be generated with the writing device being at some distance from the surface, as long as an inducer entity and an image element are in operational position one with respect to the other. Although a sliding of the writing device 10 on the viewing surface 11 of the medium is preferred, for example with direct, physical contact between the writing device and the medium, writing and/or erasing may also take place at other relative positions between the writing device and the medium, in particular without direct contact, with the writing device and the medium being spaced apart at a distance one with respect to the other.

The device preferably comprises algorithms that are capable of determining which inducer entity needs to be activated and/or disactivated, and for how long, when the device is in a particular (operational) position on the medium, in order to generate the visual representation. As the device is moved by a user over the medium (FIG. 4), one may also say that the algorithm determines which inducer entity to activate and/or disactivate at what moment in time.

The CPU and/or the device are preferably configured to use signals received from the sensor 21 and the digital information related to the visual representation in order to control inducer entities 41, 42, 43, etc, which are preferably provided in proximity of the lower surface 11 of the tool. Reference numeral 64 illustrates a data bus and/or electric lines for controlling the activity of the inducer entities.

The inducer entities are configured to be controlled, that is, activated and disactivated, for example switched on and/or off, by the data processing entity 60. Each inducer entity may exist, independently from the other user entities, in a first, activated and/or inducing state, and in a second, passive or non-inducing state.

The device of the invention preferably comprises a plurality of inducer entities. Preferably, the device comprises 5 to 10'000 inducer entities, more preferably 7 to 5'000 inducer entities, and even more preferably 10 to 2'000 inducer entities. In a preferred embodiment, the device comprises 20 to 500 inducer entities.

In an embodiment, the device comprises 25 or more, preferably 30 or more, and most preferably 50 or more inducer entities.

When in the active state, an inducer entity preferably emits a predefined amount of a form of energy in a predefined direction, in particular in a direction that is adjacent to the lower surface 11 of the device, which is in proximity or even in contact with the medium surface 35 during use. The predefined amount of energy is preferably suitable to enter the medium and to act on an image element contained in the medium and to cause the image element to generate a response, which response has preferably an effect on the light that is reflected or emitted by the medium.

The above depicted process of an inducer entity of the device 10 acting on an image element in the medium provides the writing process, which is the generation of a visual representation on the medium. In order to generate a desired visual representation, the tool preferably activates a particular inducer entity when it is in a spatial position relative to a particular image element that is to be used (for example rendered visible) for generating the visual representation, wherein said spatial position allows the inducer entity to act upon and/or induce a response of said image entity and to thereby produce a visual effect contributing to the visual representation. The spatial position generally depends on the distance between the inducer entity and the image element, the relative position or orientation of the inducer entity, and the particular form of energy that is emitted from the inducer entity.

In accordance with the above, the expression "a predetermined amount of energy in a predetermined direction" is generally intended to mean that said inducer entity, when activated, is configured to generate, in one or more image elements present at a particular position in the medium a response which contributes to the generation of said visual representation, as described in the present specification.

When an inducer entity acts on an image element, the latter is generally caused to change its position, configuration, orientation and/or light absorption characteristics, thereby affecting the modulation (e.g. reflection) of visible light impinging on said medium and contributing to the generation of said visual representation.

In the context of the present invention, "a predetermined amount of energy in a predetermined direction" refers to the inducer entity's capacity, when activated, to generate and/or modulate an electromagnetic force and/or to emit electromagnetic energy in the direction of the image element. Preferably, when in the inducing state, said inducer entities emit energy in the form of one or more selected from: a magnetic field, electromagnetic radiation, and an electric field.

In an embodiment, the inducer element is preferably configured to generate or modulate one or more selected from a magnetic field, an electric field and electromagnetic radiation.

Preferably, the magnetic field, electric field and electromagnetic radiation, as applicable, is directed in such manner and/or in such a direction so as to exert a force or effect on said image element, thereby inducing a response of said image element, the response contributing to the generation of said visual representation.

As becomes apparent from the above, the image element is selected so as to be responsive to the energy and/or or force exerted by the activated inducer element. The response of the image element to the activated inducer element is one or more selected from a change of the image element's position, configuration, orientation and/or light absorption characteristics.

The change of the image element's position, configuration and/or light absorption characteristics are such that a desired visual effect is produced on the medium. The response of the image element thereby affects the reflection of visible light impinging on said writable-erasable medium and thereby contributes to the generation of said visual representation.

It is noted that the writing tool and the medium are constructed such that, when writing, an activated inducer element acts upon a limited, preferably predefined number of image elements, which image elements are present at a particular position in the medium. In general, when activated, the energy or force emitted by the inducer element is sufficient only to induce a response in a limited number of image elements that are closest to the inducer element and/or that are in the particular, preferably predetermined position and/or orientation with respect to the inducer element, which position may be referred to as the inducing position.

In an embodiment, the inducer entities emit energy in the form of (or generate) a magnetic field. In this case, the image element is preferably responsive to a magnetic field. Preferably, the image element comprises a ferromagnetic and/or ferrimagnetic component.

In an embodiment, the inducer entities emit energy in the form of (or generate) an electric field. In this case, the image element is preferably responsive to an electric field. Preferably, the image element is selected from materials carrying one or more electric charges, materials comprising one or more permanent or non-permanent electric dipole. Non-permanent dipoles are materials that can be induced, generally by an electric field, to form an electric dipole. Also non-permanent electric dipoles adjust their orientation in the presence of an electric field and can therefore be used in accordance with the invention.

In an embodiment, the inducer entities emit energy in the form of (or generate) electromagnetic radiation. In this case, the image element is preferably responsive to electromagnetic radiation. Preferably, the image element comprises one or more selected from a photochromic, photoelectrochromic, fluorescent and/or phosphorescent component.

Preferably, in said active state, the energy or force exerted by the inducer entity is suitable to cause the image element to produce the desired response preferably resulting in the desired visual effect. As mentioned above, the visual effect is preferably stable, semi-stable and/or bistable.

For the sake of completeness, it is mentioned that, when an inducer entity is not activated, inactivated or disactivated, the electromagnetic force, energy or light that might be emitted by that inactivated or disactivated inducer entity is preferably not sufficient to induce a visually recognizable response of the image entities on the medium, even if the inducer entity is in operational distance or orientation with respect to such image entities. In a preferred embodiment, the inactivated or disactivated inducer entity does not create one or more selected from an electric field, an effective magnetic field and/or does not emit electromagnetic radiation, as applicable.

When the inducer entities emit energy in the form of a magnetic field, the inducer entity may comprise permanent magnets and/or electromagnets, for example. For example, if the inducer entity comprises permanent magnets, the activation of the inducer entity may consist in transporting the permanent magnet closer to the lower surface 11 of the device 10, such that the magnetic field exiting the tool at the lower surface is strong enough to act upon a ferromagnetic and/or ferrimagnetic image element contained in the medium. In this configuration, the device 10 preferably comprises a mechanical system for acting on the permanents magnets, for example pulling and pushing the magnets so as to generate the energy that is sufficient to act on the image element.

The Magna Doodle displays mentioned in the introduction are an example of a visual representation generated under the effect of a magnetic field of a permanent magnet.

In embodiments where the inducer element comprises an electromagnet, it can be switched on and of simply by guiding an electric current though the coil surrounding a core material in an electromagnet configuration.

In embodiments where the inducer entities are configured to produce an electric field acting on the image elements, the inducer elements preferably comprise electrodes, which can be switched on and off. The electrodes may be provided in the form of an array. As an example of image elements that react to an electric field one may mention the Gyricon e-paper display systems based on spherical beads comprising surface charges that impart a dipole moment to each bead. The manufacturing of such beads is described in U.S. Pat. No. 6,097,531. The beads are provided in an oil-filled capsule, where the beads can rotate in dependence of the electrical field. Depending on the rotational position, the beads may expose a particular color, black or white to the viewing surface of the medium.

In embodiments where the inducer entities are configured to produce electromagnetic radiation acting on the image elements, the inducer elements preferably comprise a source of light, and the image element preferably comprises one selected from a photochromic, photoelectrochromic, fluorescent and/or phosphorescent material. Accordingly, once illuminated by the source of light of the inducer element, the image element changes and/or or exhibits the desired color characteristics. For example, the image element can change or loose color depending on the wavelength of the light that impinges on it. An exemplary document disclosing a photochromic medium is JP2004258474.

For the purpose of the present specification, black and white are considered as colors.

It is noted here that the size of each image element is not particularly limited, as the image element may be selected from a molecule and a particle. Depending on the desired resolution, it is preferred to have image elements that are relatively small, preferably close to the boundary of what the human eye can distinguish as a separate entity. In an embodiment, an image element of the present invention has a maximum dimension in the range of 0.5 nm (in the case of a molecule) to 1.5 mm, preferably from 1 nm to 1 mm, even more preferably from nm to 0.5 mm.

If the image element is a particle, for example a ferromagnetic or ferrimagnetic particle and/or a particle having a permanent or non-permanent dipole moment and/or carrying electric charges, the size of the particle is preferably selected from nano and microparticles and is preferably in the range of 1 nm to 200 $\mu$m, preferably 0.5 $\mu$m to 100 $\mu$m, most preferably from 1 $\mu$m to 50 $\mu$m. In an embodiment, the particles have a mean dimension of 1-10 $\mu$m.

Figure 3:
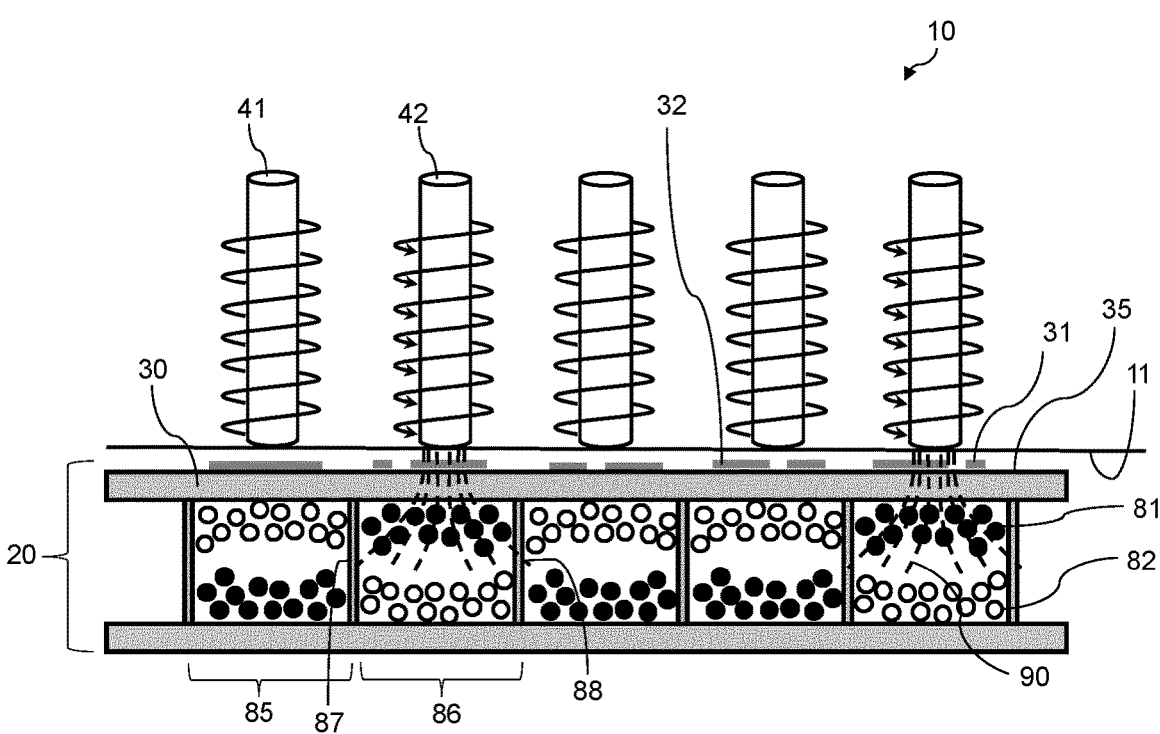
FIG. 3 is a schematic cross-section illustrating the writable-erasable medium of FIG. 2 and inducer entities of the hand holdable device of FIG. 1 operatively positioned with respect to image elements of the writable-erasable medium.

As becomes apparent, the response of a single image element to an activated inducer entity may not be sufficient to generate a change on the medium that is recognizable to the human eye. Therefore, as illustrated in FIG. 3, an activated inducer entity generally generates a response in a plurality of image elements. It is noted that the skilled person may adjust the response generated by the inducer entity in the image elements of the medium by adjusting the amount of energy emitted, e.g. the magnitude of the magnetic and/or electric field and/or the intensity of the electromagnetic radiation.

The invention also provides a medium 20 that is configured to display a visual representation 50 when being addressed or driven by the writing tool 10 (FIG. 4).

In a preferred embodiment the medium 20 comprises marker information. The marker information is preferably 2D marker information.

Figure 2:
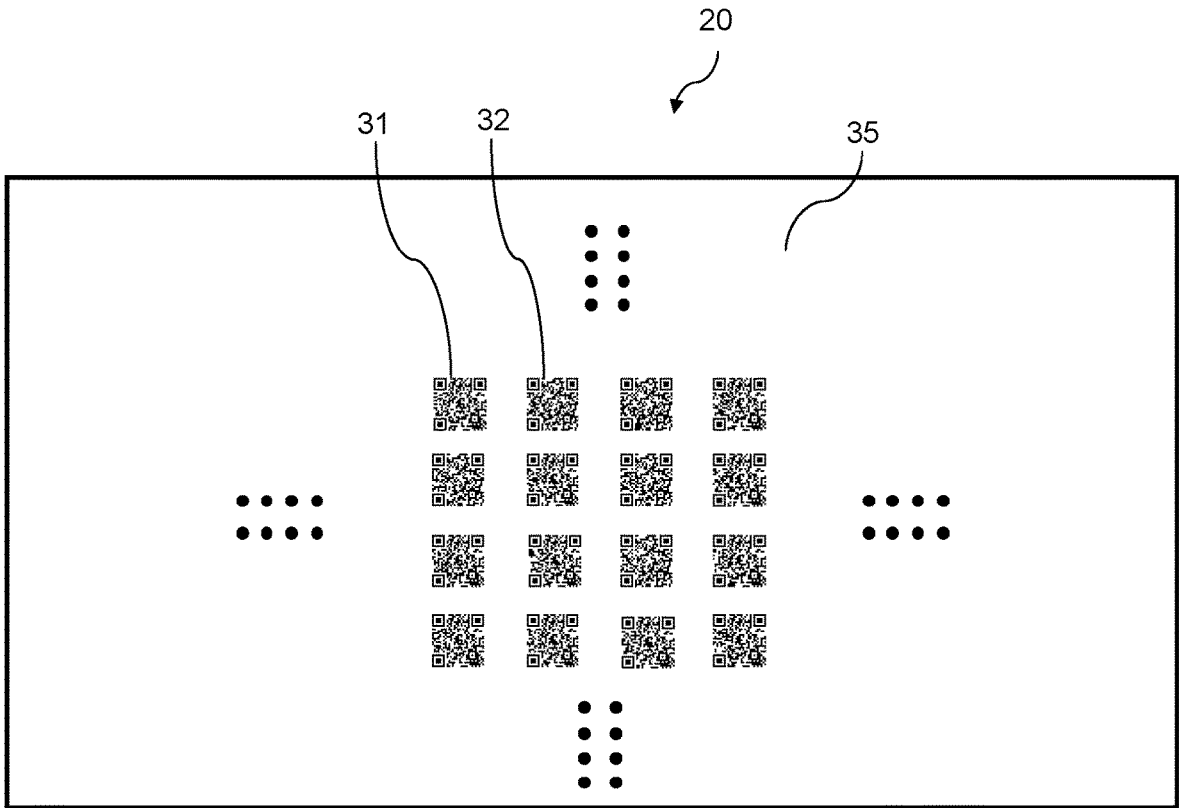
FIG. 2 is a schematic top-down view on the medium according to an embodiment of the invention, in which the marker codes are shown visible and enlarged for the purpose of illustration.

The 2D marker information is preferably provided in the form of a plurality of marker images or codes 31, 32, . . . , as shown in FIG. 2. The marker images or codes 31, 32 may be provided in the form of QR codes, for example, or in the form of any other suitable 2D representations, images, signs or shapes.

Preferably, the marker information is provided on a transparent support 30. Preferably, the transparent support provides at least part of the viewing surface 35 of the medium. Preferably, the transparent support comprising said two-dimensional marker information is integral part of the medium. In an embodiment, the support provides a viewing surface of the medium.

In an embodiment, said marker information, for example said images or codes, is distributed over a surface 35 of said writable-erasable medium, said surface 35 corresponding to or overlapping at least partially with a viewing surface 35 on which said visual representation is provided and/or through which said visual representation is visible to the user of the medium.

In a preferred embodiment, the marker information 31, 32, . . . is permanent and/or is separate from the inducible image elements 81, 82 . . . . Preferably, the marker information, such as said images or codes, are not generated or induced during the use of a tool. Preferably, the marker information remains constant and/or identical for a given medium, preferably over the working life of the medium.

In the embodiment shown in FIG. 2, said marker information, in particular said images or codes, form together an array and/or are aligned in rows and columns across said viewing surface, wherein said lines and/or rows preferably form an array. Preferably, neighbouring images or codes within the array are spaced apart by constant distances. In other words, the distance from one code to the next code in the same line and/or row of the array remains preferably constant.

Preferably, the marker density per unit length is equal to or larger than the density per unit length of addressable image pixels (or other image units, dots, compartments, etc, see reference numerals 85, 86 and the discussion of FIG. 3)

in the medium. The density of markers of the medium will determine the quality of the image that the system of the writing tool and the medium can generate.

In a preferred embodiment, each marker code and/or image is asymmetrical. This preferably applies to the 2D aspect of the marker code. Preferably, the marker code and/or image lacks an axe of symmetry on the 2D surface on which it is provided.

In a preferred embodiment, each marker code and/or image is unique within a particular writing medium. Each marker code and/or image preferably comprises a unique and asymmetric image, which cannot be brought in congruency with any other marker code and/or image, even when (mentally) rotating the marker code and/or image. This preferably applies to the 2D aspect of the marker code. Accordingly, a given geometrical 2D arrangement (for example, a QR code) is present only once with each medium, such that a position and orientation of the writing tool on the medium can be determined on the basis of one single marker 31, 32, etc. In other words, any marker element 31 is entirely different from any other marker element 32 of the medium.

In another embodiment, a plurality of marker elements taken together provides a unique 2D arrangement on the medium, wherein the writing tool comprises one or more sensor capable of capturing the plurality of marker elements simultaneously or within a relatively short period of time, for example when the writing device is stationary or is moving.

FIG. 3 shows selected components taken from the writing tool and the medium of embodiments of the invention, for illustrating the operation principle.

In the embodiment shown, the medium 20 encompasses upper surface 35, which is also the display surface of the medium, through which a visual representation is displayed and visible to a user of the medium. In the embodiment shown, the upper surface 35 is the upper surface of a transparent substrate 30, which substrate is preferably transparent to visible light, but not necessarily to IR and UV light.

The marker information 31, 32, . . . , is preferably provided on said substrate 30. In accordance with this embodiment, the marker information is directly provided on the viewing surface 35 of the medium.

In an embodiment (not shown), the marker information is provided on the underside of a transparent substrate, and the opposed, upper side or of said substrate provides the viewing surface 35 of the medium. In this embodiment, the underside of the transparent substrate is preferably directed towards the inside of the device, whereas the upper side is oriented towards the outside. In such an embodiment, or also in other cases, the substrate 30 is also transparent to the light emitted by the light source 70 of the writing tool (FIG. 1) and to the non-visible light (e.g. UV, IR) reflected from the marker information 31, 32, . . . and captured by the sensor 21.

The marker information may be printed on or engraved in a substrate 30, preferably a transparent substrate.

The marker information 31, 32, . . . , is preferably transparent to visible light, but preferably reflects and/or absorbs non-visible light. Preferably, the marker information reflects or emits non-visible light, for example UV and/or IR light, most preferably the marker information reflects or emits exclusively UV and/or IR light.

As can be understood from considering FIGS. 1 and 3, when the writing tool 10 is moved over the medium, the sensor 20 of the writing tool 10 produces signals related to the light that is reflected and/or emitted by the marker information. These signals are interpreted by the data processing entity 60, for example by algorithms contained in the data processing entity, so as to determine the position and orientation of the writing tool on the display surface of the medium, and thus also the particular position and/or orientation of the inducing entities 41, 42, 43, . . . , on the medium, and in particular the relative position of the inducing entities with respect to image entities 81 or compartments 85, 86 contained in the medium. Based on the information related to a visual representation to be generated on the medium, the writing tool 10, and in particular the data processing entity 60, activates and/or disactivates inducing entities 41, 42 at the appropriate moment and/or when they are in the appropriate position for activating an image element 81, or a group of image elements provided in a compartment.

In the embodiment shown in FIG. 3, the inducer entities 41, 42 are electromagnets, and when switched on, they generate a magnetic field 90 that penetrates into the inside of the medium 20, which contains image elements 81 in the form of ferromagnetic and/or ferrimagnetic particles. In the embodiment shown, these ferromagnetic and/or ferrimagnetic particles are dark or black, and are attracted in the direction of the visible display surface 31 under the effect of the magnetic field 90. When so doing, they displace white or clear particles 82 so as to generate a coloured, dark or black spot on the viewing surface.

In another embodiment, the ferromagnetic and/or ferrimagnetic particles may move across a clear or white, preferably translucent matrix. Said matrix may be substantially immobile.

In the embodiment shown in FIG. 3, the image elements 81, 82 are provided in spatially defined and/or confined compartments, cavities, units blocks, image dots, and/or pixels 85, 86. The compartments preferably provide and/or define an individually addressable image dot or unit. Preferably, the size of the compartments is constant and/or the density of compartments over a distance (number of compartments per unit length) is constant in the medium.

One purpose of the compartments is to limit the lateral spatial movement of the image elements over long distance which could result in non-uniform spatial distribution of image elements at larger distance scale. The lateral wall could ensure the amount of image elements within the dimension of the compartments is fixed, therefore the achievable color contrast of an image dot could be guaranteed. For the medium without lateral wall, the image elements could overly accumulate at certain localized regions due to the attraction force of the magnetic field, leading to some regions lack of image elements, as a result the image quality of the generated visual representation is also diminished.

In FIG. 3, the lower surface 11 of the writing tool 10 is shown not to be in direct, physical contact with the substrate 30 of the medium. The tool 10 may comprise spaceholder elements (not shown), for example attached at some positions of the underside 11 of the device, so as to keep the underside 11 at a predetermined and preferably constant distance away from the upper surface of the medium. Such spaceholder elements may be provided by rolling balls or sliding elements, comprising a low-friction material, favouring sliding of the device on the medium. In another embodiment, the lower surface 11 of the device 10 slides directly on the upper surface, on the substrate 30 and/or on the markers 31, 32 of the medium.

In another embodiment, the lower surface 11 is away from the substrate 30 within a designed maximum working distance where the inducer entities 41, 42 can still address the image elements 81 and the lower surface is not necessarily parallel to the substrate 30. In accordance with this embodiment, the distance information between each inducer and the corresponding addressing image elements 81 is calculated by the stored algorithm based on the deformation of the marker images captured by the image sensor 21. For example, if the writing tool 10 is away from the medium surface 35, the captured marker image will be smaller than the one when the writing tool 10 is close to the medium surface 35. If the lower surface 11 of the tool 10 is not parallel to the medium surface 35, the captured marker image will show smaller dimension at the direction where the writing tool is more incline to the surface 35. This embodiment may apply, for example, to embodiments where the inducer elements emit energy in the form of electromagnetic radiation, which electromagnetic radiation is suitable to induce a response in said image elements even if the writing device is at the defined working distance away from the medium.

FIG. 4 illustrates the generation of a visual representation 50, here a text, using the writing device 10, and sliding the device preferably manually over the display surface 35 of the medium 20. Only the inducer entities 41, 42 of the writing device are schematically illustrated. As the data processing entity in the device 10 determines the position of the device on the medium, the device activates inducer entities 41, 42, which, as they move over the medium 20, act upon the image entities of the medium and generate the visual representation 50.

In this configuration, an advantage is that the writing device 10 is entirely free-moving or free-movable and not connected to any other base station or device. The device does not require markers provided on a lateral frame of the device, or any particular starting point provided somewhere on the medium or the frame thereof. The driver device 10 may thus have any shape size or form, and may in particular have a maximum extension L that may be smaller than any one of the lateral sides 28, 29, respectively, of the medium 20. Furthermore, with the device of the invention, the writing process may be started arbitrarily at any position of the medium. Information related to the size of the writable surface medium may be encoded in the marker information, for example, or may be entered as an input by a user in the writing device.

Furthermore, in contrast to writable-erasable media described in the prior art, the device of the invention does not require an initial reading or scanning step, where a visual representation is first read, before it can be reproduced on a medium.

Thanks to the plurality or inducers, the writing tool is configured to write or print a continuous and/or contiguous area of the medium when the device moves in the writing mode with respect to the medium (FIG. 4). When a user moves the device 10, it is possible that an area of the medium that has already been written is at least partially covered again by the device. In other words, the areas covered by the device moved manually by a user over the medium when writing a visual representation may overlap, and/or certain areas may be covered repeatedly by the device in the writing of a single visual representation and/or in a single writing process (as opposed to re-writing after erasure, where the same area is logically also covered again).

In a preferred embodiment, the device comprises and/or employs an algorithm and/or computer code that causes the device to memorize the areas, pixels, dots, compartments, etc, of the medium that have already been written, and avoids reprinting of the same area, pixels, dots, compartments, etc, respectively. In this manner, the writing process may be conducted with optimal resolution and without loss of information of the visual representation. Such an algorithm and/or code is in particular helpful if the writing device comprises many inducers, which may cover very narrow distances, as discussed with reference to FIG. 5.

The medium of the invention is preferably writable-erasable, and any visual representation 50 generated under the action of the writing device 10 can thus be erased. The erasing mechanism depends on the system of image elements and inducer entities used. For example, if the image elements are responsive to an electric field, an electric field with a polarity inverse to the field used to generate the visual representation is used to erase the visual representation.

Erasure of the writable-erasable medium responsive to a magnetic field may be conducted by a permanent magnet moved on the backside of the medium. More generally, a permanent magnet may be used to attracting the image elements in a direction opposed to the direction induced by the writing device. In an embodiment that image elements are comprised of permanent magnets with different colors on opposed or different sides of poles, the erasure may be accomplished by flipping the image elements with a permanent or electromagnet having inverse polarity. If the writing device comprises electromagnets, the polarity of the magnet may be inversed by changing the direction of the current flow through the coil wire of the electromagnet, and the writing device may also used to erase the visual representation. In an embodiment that image elements assume a more ordered and/or gathered state when contributing to an image, the permanent magnet may disperse the image elements.

If the image elements are responsive to electromagnetic radiation, in particular if they are photochromic materials, the erasure may be accomplished by illuminating the medium with light suitable to reverse the color change brought about by the light emitted by the inducer entities.

If the image elements are photoelectrochromic materials, erasure may be accomplished by electrical means, for example providing electrodes and applying a potential suitable to remove photogenerated electrons from the photoelectrochromic material.

In some embodiments, the medium may also comprise electrodes which are specifically provided for erasure.

In FIGS. 1, 3 and 4, inducer entities 41, 42, . . . , of the writing tool are shown to form a linear array, one inducer entity next being to the other on a straight line. Of course, the writing tool is not limited to such a positioning, and the inducer elements may be positioned in any desired way within the writing tool. It is noted that there is preferably a predetermined and, in an embodiment, constant distance between each inducer entity and its closest neighbour. In accordance with this embodiment, there is preferably a predetermined, constant distance between inducer entities.

In an embodiment, inducer entities of the writing tool are preferably spaced apart by a given minimum distance. This makes sure that the response generated by one inducer entity does not extend to the operational field of another inducer entity. For example, referring to FIG. 3, the distance between inducer entities 41 and 42 is selected such that when inducer entity 42 is activated but entity 41 is not (as shown), inducer entity 42 does not generate a response in the image elements that are closer to the inducer entity 41. In FIG. 3, the activated inducer entity 42 is sufficiently distanced from inducer entity 41 not to induce a noticeable response in the image entity present in compartment 85. On the other hand, the distance between the neighbouring inducers should be close enough in order to result adequate image quality of the generated visual representation as the number of inducer density per length reflects the DPI (dot per inch) of the printed image.

In an embodiment where the inducing method is conducted through magnetic field, the writing tool may comprise an array of electromagnets with different possible forms, preferably a rod-shape or a U-shape or their variation. In another embodiment where the inducing method is through magnetic field, the writing tool may comprise an array of actuators with permanent magnets, in which each actuator could move back and forth the permanent magnets close to or away from the medium.

In an embodiment where the inducing method is conducted through electrical field, the writing tool may comprise an array of electrodes made of electrically conductive materials.

In an embodiment where the inducing method is conducted through electromagnetic radiation, the writing tool may comprise an array of independently controlled light sources, for example an array of laser, a laser diode array, an array of light emitting diodes (LEDs) or an array of organic light emitting diodes (OLEDs). In another embodiment where the inducing method is conducted through electromagnetic radiation, the writing tool may comprise one or multiple light sources and a spatial light modulation method, for example a light source with an array of liquid crystal light valves or a light source with digital micro-mirror devices (DMDs).

Figure 5:
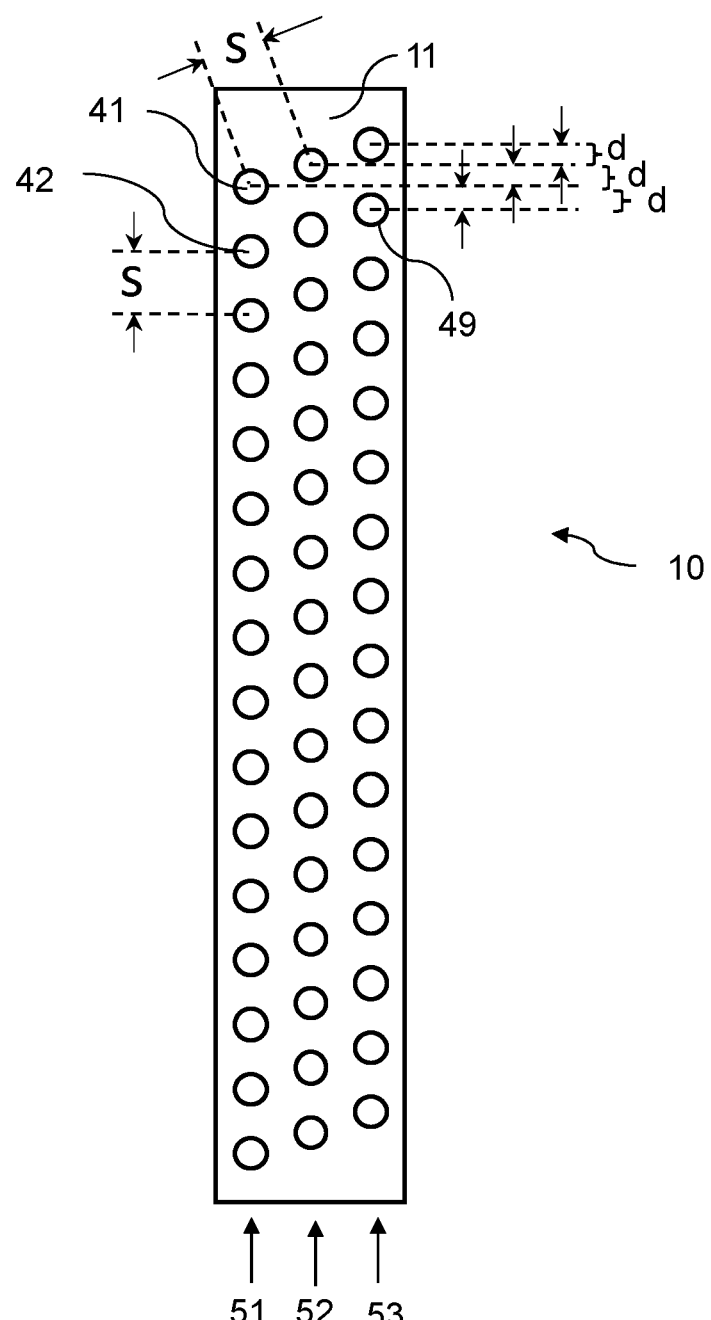
FIG. 5 is a schematic view showing the disposition of individually addressable inducer entities in a hand holdable device according to an embodiment of the invention.

FIG. 5 is a top-down view onto the underside 11 of the writing tool 10 according to another embodiment, showing a disposition of inducer entities 41, 42, 49, etc, in parallel lines 52, 52, 53. The inducer entities in each of these lines are shown to be offset by a distance (d) along the respective line with respect to the inducer entity in a neighbouring line. This particular arrangement of inducer entities within the writing tool 10 allows for a more precise, higher resolution generation of the visual representation, considering the minimum possible physical spacing between two inducers (s). Due to the size of an inducer itself, there is a maximum number of inducer density per unit length if the inducers are arranged in an 1D array. The image quality of the printed visual representation is therefore limited by the density of the inducers. In order to increase the image quality based on the same inducer size, the configuration in FIG. 5 or other similar kinds based on the same concept may be implemented. As during the printing process, the writing tool is in principle traveling along the direction perpendicular to its long axis, the distance (d), which is the projecting length of the spacing between inducers on the long axis, defines how close two dots could be printed to reproduce the visual representation. The distance (d) in principle could be any value smaller than (s) but larger than 0. In an embodiment where the distance (d) is still larger than the distance between any two neighbouring makers 31, 32 and/or the distance between neighbouring pixels of visual representation with desired DPI, an algorithm allowing the writing tool 10 remember the already printed pixels of the visual representation accompanied with multiple movement of the writing tool 10 over the same region of the medium can complete the writing with acceptable minimum loss of information on the visual representation.

While certain of the preferred embodiments of the present invention have been described and specifically exemplified above, it is not intended that the invention be limited to such embodiments. Various modifications may be made thereto without departing from the scope and spirit of the present invention, as set forth in the following claims. Herein below, examples of the invention are disclosed. These examples are for illustration only and are not intended to limit the scope of the present invention.

The invention claimed is:

1. A hand holdable writing device suitable for generating a visual representation on a writable-erasable medium comprising a plurality of image elements, the device comprising:
   a sensor capable of sensing non-visible light and configured to produce signals related to two-dimensional marker information associated with said writable-erasable medium;
   a plurality of inducer entities each inducer entity being configured for assuming independently at least two states, a first, inducing state, and a second, passive state, wherein, when in said first state, said inducer entities are configured for directing a predetermined amount of energy in the form of electromagnetic radiation in a predetermined direction; and
   a data processing entity, configured for acting on individual inducer entities so as to switch between said first and second states, said data processing entity being configured to act on said inducer entities on the basis of the signals produced by said sensor and on the basis of the visual representation to be generated on said writable-erasable medium,
   wherein said electromagnetic radiation is appropriate to generate a change of the light absorption characteristics in one or more image elements of said plurality of image elements, thereby contributing to the generation of said visual representation.

2. The device of claim 1, further comprising a light source, configured to emit electromagnetic radiation that is reflected or absorbed by said marker information so as to provide said non-visible light that can be sensed by said a sensor.

3. The device of claim 1, wherein said data processing entity is configured to determine, from the signal produced by said sensor, one or more selected from the group consisting of: (i) the position of the hand holdable device on the writable-erasable medium, (ii) the orientation or angle of the hand holdable device on the writable-erasable medium; and (iii) the position and/or orientation of one, several or all of said inducer entities with respect to said writable-erasable medium, and in particular with respect to an image element of said writable-erasable medium.

4. The device of claim 1, wherein said two-dimensional marker information is transparent to visible light.

5. The device of claim 1, wherein said two-dimensional marker information is provided on a transparent support.

6. The device of claim 1, wherein said two-dimensional marker information comprises a plurality of two-dimensional marker images or codes, wherein said marker images or codes are distributed over a surface of said writable-erasable medium, said surface corresponding or overlapping at least partially with a viewing surface on which said visual representation is provided.

7. The device of claim 6, wherein said marker images or codes form an array and/or are aligned in rows and columns.

8. The device of claim 1, wherein said two-dimensional marker information comprises a plurality of two-dimensional marker images or codes, each image or code being unique within a particular medium, such that a signal produced by said sensor when capturing invisible light reflected or emitted from said marker information, can be analyzed by said data processing entity so as to determine position and/or orientation information related to the hand holdable device with respect to said writable-erasable medium.

9. The device of claim 1,
wherein said image element comprises a photochromic and/or photoelectrochromic component.

10. The device of claim 1, further comprising optics, preferably comprising one or more lenses, mirrors and/or filters, said optics being provided to guide non-visible light reflected or emitted from said marker information towards said sensor.

11. A writable-erasable medium capable of providing an erasable visual representation, the medium comprising a plurality of image elements, which, depending on a position, configuration, orientation and/or light absorption characteristics of said image elements, affect the reflection of visible light impinging on said writable-erasable medium and contribute to the generation of said visual representation, said medium further comprising a transparent support and two-dimensional marker information associated with said support, wherein said marker information is transparent to visible light, and wherein said image element comprises a photochromic and/or photoelectrochromic component.

12. The medium of claim 11, wherein said two-dimensional marker information comprises a plurality of two-dimensional marker images and/or codes, wherein said marker images and/or codes are distributed over a surface of said writable-erasable medium, said surface corresponding to or overlapping at least partially with a viewing surface on which said visual representation is provided and/or through which said visual representation is visible to the user of the medium.

13. The medium of claim 11, wherein said marker images and/or codes form an array and/or are aligned in rows and columns on said support and/or across said viewing surface.

14. The medium of claim 11, wherein said two-dimensional marker information comprises a plurality of two-dimensional marker images and/or codes, each code and/or image being unique within a particular writing medium and/or each image or code being asymmetrical.

15. The medium of claim 11, which is configured to display said visual representation under the control of a device, wherein the device comprises:
a sensor capable of sensing non-visible light and configured to produce signals related to two-dimensional marker information associated with said writable-erasable medium;
a plurality of inducer entities each inducer entity being configured for assuming independently at least two states, a first, inducing state, and a second, passive state, wherein, when in said first state, said inducer entities are configured for directing a predetermined amount of energy in a predetermined direction; and
a data processing entity, configured for acting on individual inducer entities so as to switch between said first and second states, said data processing entity being configured to act on said inducer entities on the basis of the signals produced by said sensor and on the basis of the visual representation to be generated on said writable-erasable medium.

16. The medium of claim 11, wherein said transparent support comprising said two-dimensional marker information is integral part of the medium.

17. An assembly comprising the writing device of claim 1 and a writable-erasable medium capable of providing an erasable visual representation, the medium comprising a plurality of image elements, which, depending on a position, configuration, orientation and/or light absorption characteristics of said image elements, affect the reflection of visible light impinging on said writable-erasable medium and contribute to the generation of said visual representation, said medium further comprising a transparent support and two-dimensional marker information associated with said support, and wherein said marker information is transparent to visible light.

18. The device of claim 1, wherein said data processing entity is configured to determine from said two dimensional marker information the distance and/or the tilting angle of the writing device with respect to a viewing surface of the medium.

* * * * *